United States Patent
Liu et al.

(10) Patent No.: US 10,412,643 B1
(45) Date of Patent: Sep. 10, 2019

(54) OFF CHANNEL SCANNING ON WORKGROUP BRIDGE (WGB) DEVICES FOR FAST ROAMING

(71) Applicant: Cisco Technology, Inc., San Jose, CA (US)

(72) Inventors: Jun Liu, Shanghai (CN); Qiang Yang, Shanghai (CN); Jiewei Li, Shanghai (CN); Xia Ke, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/172,747

(22) Filed: Oct. 27, 2018

(51) Int. Cl.
*H04W 36/00* (2009.01)
*H04W 4/20* (2018.01)
*H04W 8/26* (2009.01)
*H04W 36/18* (2009.01)
*H04W 48/16* (2009.01)

(52) U.S. Cl.
CPC ......... *H04W 36/0088* (2013.01); *H04W 4/20* (2013.01); *H04W 8/26* (2013.01); *H04W 36/0061* (2013.01); *H04W 36/18* (2013.01); *H04W 48/16* (2013.01)

(58) Field of Classification Search
CPC ......... H04W 36/0088; H04W 36/0061; H04W 48/16; H04W 8/26; H04W 4/20; H04W 36/18
USPC ........................................... 455/436; 370/338
See application file for complete search history.

(56) References Cited

U.S. PATENT DOCUMENTS

2015/0264614 A1* 9/2015 Stager ............... H04W 36/0061
370/332

* cited by examiner

*Primary Examiner* — Marcos Batista
(74) *Attorney, Agent, or Firm* — Merchant & Gould P.C.

(57) ABSTRACT

Off channel scanning on workgroup bridge (WGB) devices for fast roaming may be provided. First, it may be determined, by a first WGB, that a second WGB is not off-channel. The second WGB may be peered with the first WGB. Next, the first WGB may perform channel scanning in response to determining that the second WGB is not off-channel. The first WGB may then prioritize a first WGB channel list based on results from the channel scanning performed by the first WGB. Next, the first WGB may roam while the second WGB in not off-channel, from a first access point to a second access point on a channel with the highest priority in the first WGB channel list.

20 Claims, 5 Drawing Sheets

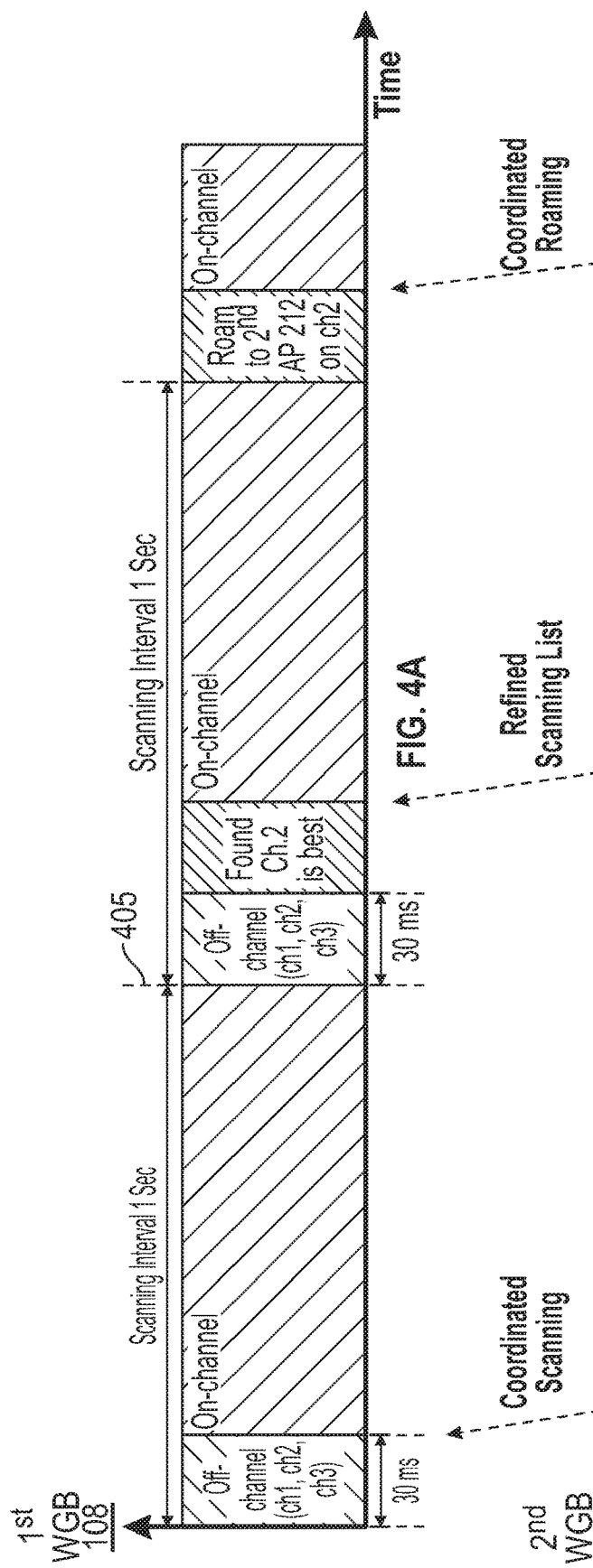
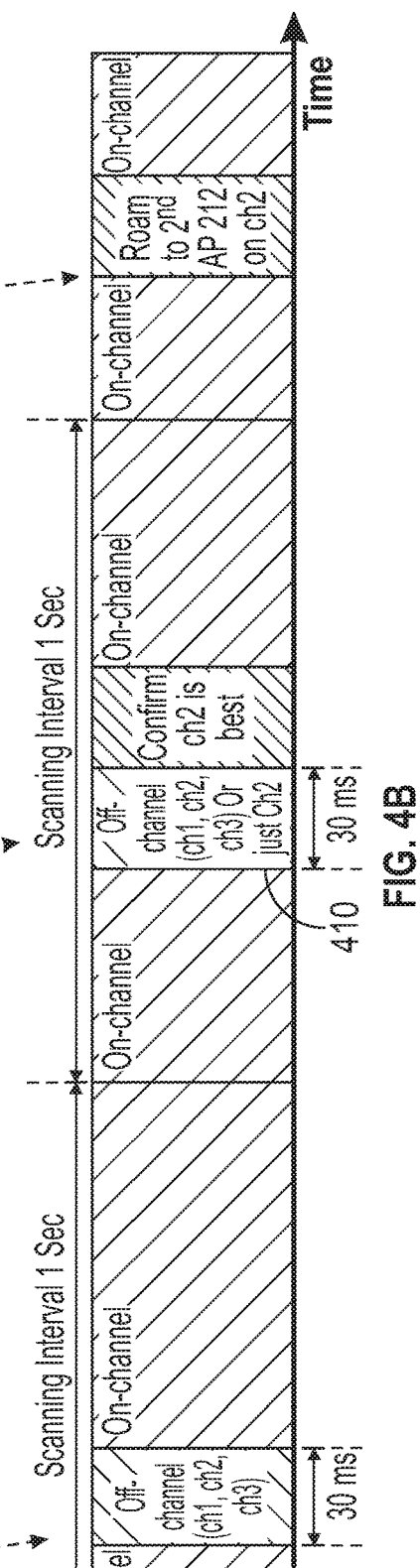

OFF CHANNEL SCANNING ON WORKGROUP BRIDGE (WGB) DEVICES FOR FAST ROAMING

TECHNICAL FIELD

The present disclosure relates generally to fast roaming.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIGS. 4A and 4B illustrate channel scanning timing; and

DETAILED DESCRIPTION

Overview

Figure 1:
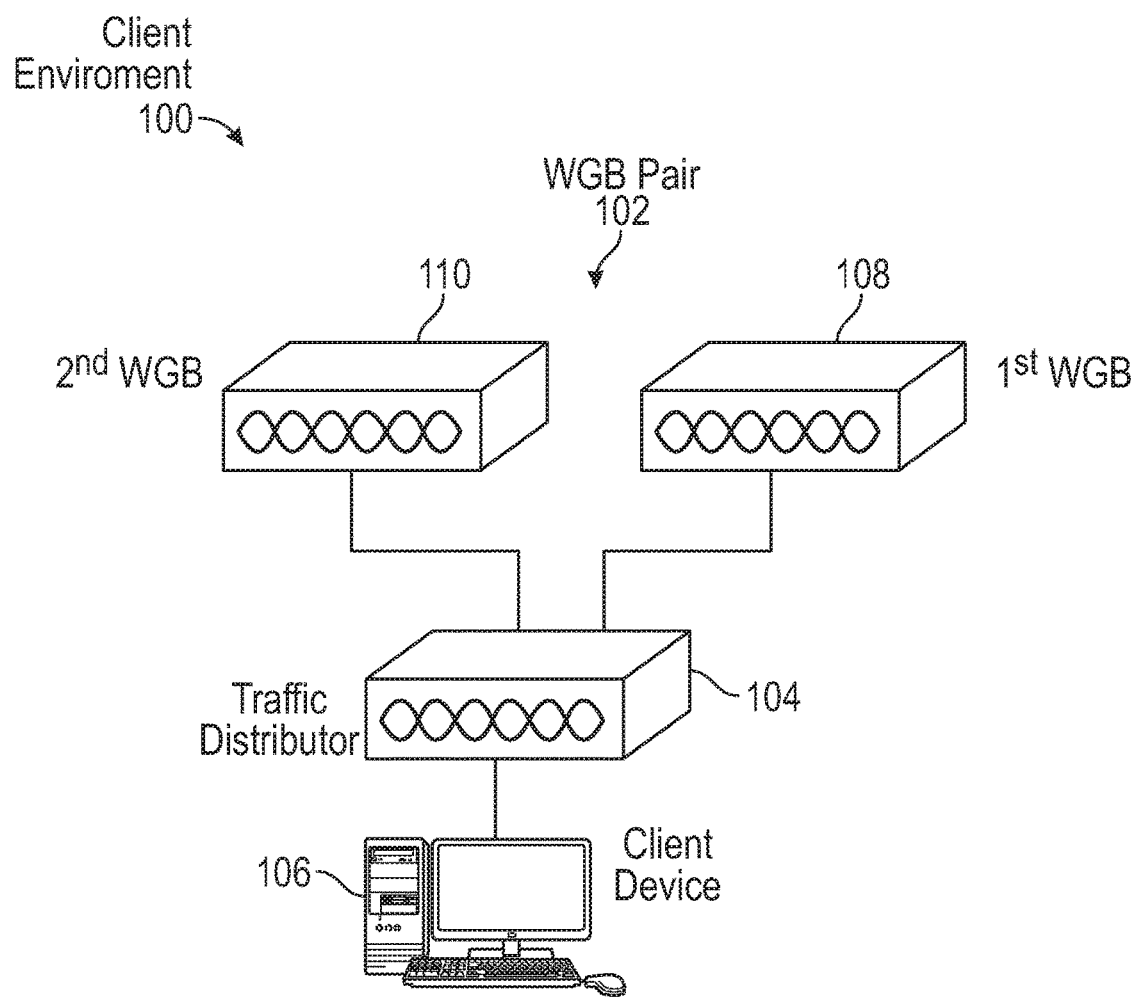
FIG. 1 is a block diagram of client environment.

Off channel scanning on workgroup bridge (WGB) devices for fast roaming may be provided. First, it may be determined, by a first WGB, that a second WGB is not off-channel. The second WGB may be peered with the first WGB. Next, the first WGB may perform channel scanning in response to determining that the second WGB is not off-channel. The first WGB may then prioritize a first WGB channel list based on results from the channel scanning performed by the first WGB. Next, the first WGB may roam while the second WGB in not off-channel, from a first access point to a second access point on a channel with the highest priority in the first WGB channel list.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In networks with multiple channel deployment, off channel scanning on a client side may be used to obtain minimum roaming latency. However, in this situation, packet loss may occur due to the off-channel scanning. The impact of the off-channel scanning may increase when fast roaming processes need pre-authentication because the processes may need several off-channel scanning attempts to select, for example, a best candidate Access Point (AP). Because many loss sensitive applications (i.e., voice and video) may be deployed together with fast roaming processes, fast off-channel scanning may improve the user experience.

Accordingly, embodiments of the disclosure may provide, on a client side, two Workgroup Bridges (WGBs) that may be wired to a client to obtain a wireless connection to infrastructure side APs. By coordinating off-channel scanning by the two WGBs on the client side, packet loss during off-channel scanning may be minimized. Furthermore, by communicating off-channel scanning results between the two WGBs, roaming may be optimized with an optimized channel list and scanning timing.

FIG. 1 shows a client environment 100 consistent with embodiments of the disclosure. As shown in FIG. 1, client environment 100 may comprise a WGB pair 102, a traffic distributor 104, and a client device 106. WGB pair 102 may comprise a first WGB 108 and a second WGB 110. Second WGB 110 may be peered with first WGB 108 by a wired connection and they may be kept alive with each other by a heartbeat message. Client device 106 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. Traffic distributor 104 may comprise a device that may balance data traffic to and from client device 106 between first WGB 108 and a second WGB 110.

Each of first WGB 108 and second WGB 110 may comprise a stand-alone unit that may provide, for example, a wireless infrastructure connection for Ethernet-enabled devices. Devices (e.g., client device 106) that may not have a wireless client adapter in order to connect to a wireless network may be connected to first WGB 108 and second WGB 110 through traffic distributor 104 using Ethernet ports for example. First WGB 108 and second WGB 110 may associate to an AP through a wireless interface. In this way, wired clients (e.g., client device 106) may receive access to a wireless network. First WGB 108 and second WGB 110 may connect, for example, to traffic distributor 104 through an Ethernet port that uses a 10-Base-T connector. Similarly, client device 106 may connect, for example, to traffic distributor 104 through an Ethernet port that uses a 10-Base-T connector. In other words, first WGB 108 and second WGB 110 may provide wireless access connectivity to wired clients (e.g., client device 106) by establishing a wireless connection to an AP that may treat first WGB 108 and second WGB 110 as wireless clients.

Figure 2:
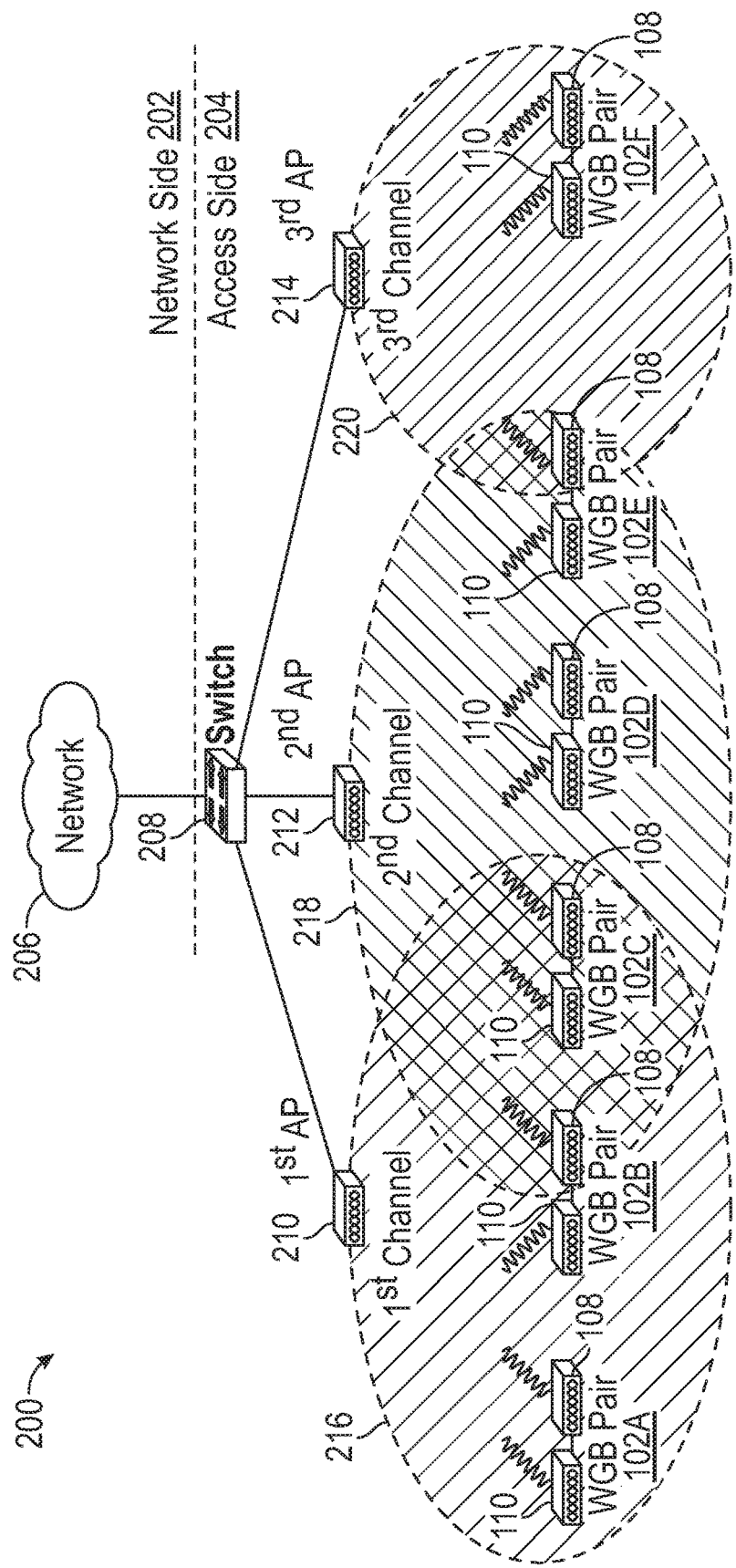
FIG. 2 is a block diagram of an operating environment.

FIG. 2 shows an operating environment 200 consistent with embodiments of the disclosure for providing off channel scanning on WGB devices for fast roaming. As shown in FIG. 2, operating environment 200 may comprise a network side 202 and an access side 204. Network side 202 may comprise a network 206. Access side 204 may comprise a switch 208, a first AP 210, a second AP 212, and a third AP 214. First AP 210 may provide wireless access to network 206 in a first coverage area 216 on a first channel. Second AP 212 may provide wireless access to network 206 in a second coverage area 218 on a second channel. And third AP 214 may provide wireless access to network 206 in a third coverage area 220 on a third channel. As will be described in greater detail below, WGB pair 102 (e.g., comprising first WGB 108 and second WGB 110) may pass through first coverage area 216, second coverage area 218, and third coverage area 220 at various positions comprising "A", "B", "C", "D", "E", and "F" as shown in FIG. 2.

First AP 210, second AP 212, and third AP 214 may provide a WLAN. Through this WLAN, client device 106 may be provided with access to network 206. Network 206 may comprise a network operated by an institution or enterprise that a user of client device 106 may be associated with. Access to network 206 may also provide client device 106 with access to the Internet or other cloud-based networking environments.

As shown in FIG. 2, at position "A", first WGB 108 and second WGB 110 may be wirelessly attached to first AP 210 on the first channel. At position "B", first WGB 108 may be wirelessly attached to second AP 212 on the second channel and second WGB 110 may be wirelessly attached to first AP 210 on the first channel. At positions "C" and "D", first WGB 108 and second WGB 110 may be wirelessly attached to second AP 212 on the second channel. At position "E", first WGB 108 may be wirelessly attached to third AP 214 on the third channel and second WGB 110 may be wirelessly attached to second AP 212 on the second channel. At position "F", first WGB 108 and second WGB 110 may be wirelessly attached to third AP 214 on the third channel.

The elements of client environment 100 and operating environment 200 (e.g., traffic distributor 104, client device 106, first WGB 108, second WGB 110, switch 208, first AP 210, second AP 212, and third AP 214) may be practiced in hardware and/or in software (including firmware, resident software, micro-code, etc.) or in any other circuits or systems. The elements of client environment 100 and operating environment 200 may be practiced in electrical circuits comprising discrete electronic elements, packaged or integrated electronic chips containing logic gates, a circuit utilizing a microprocessor, or on a single chip containing electronic elements or microprocessors. Furthermore, the elements of client environment 100 and operating environment 200 may also be practiced using other technologies capable of performing logical operations such as, for example, AND, OR, and NOT, including but not limited to, mechanical, optical, fluidic, and quantum technologies. As described in greater detail below with respect to FIG. 5, the elements of client environment 100 and operating environment 200 may be practiced in a computing device 500.

Figure 3:
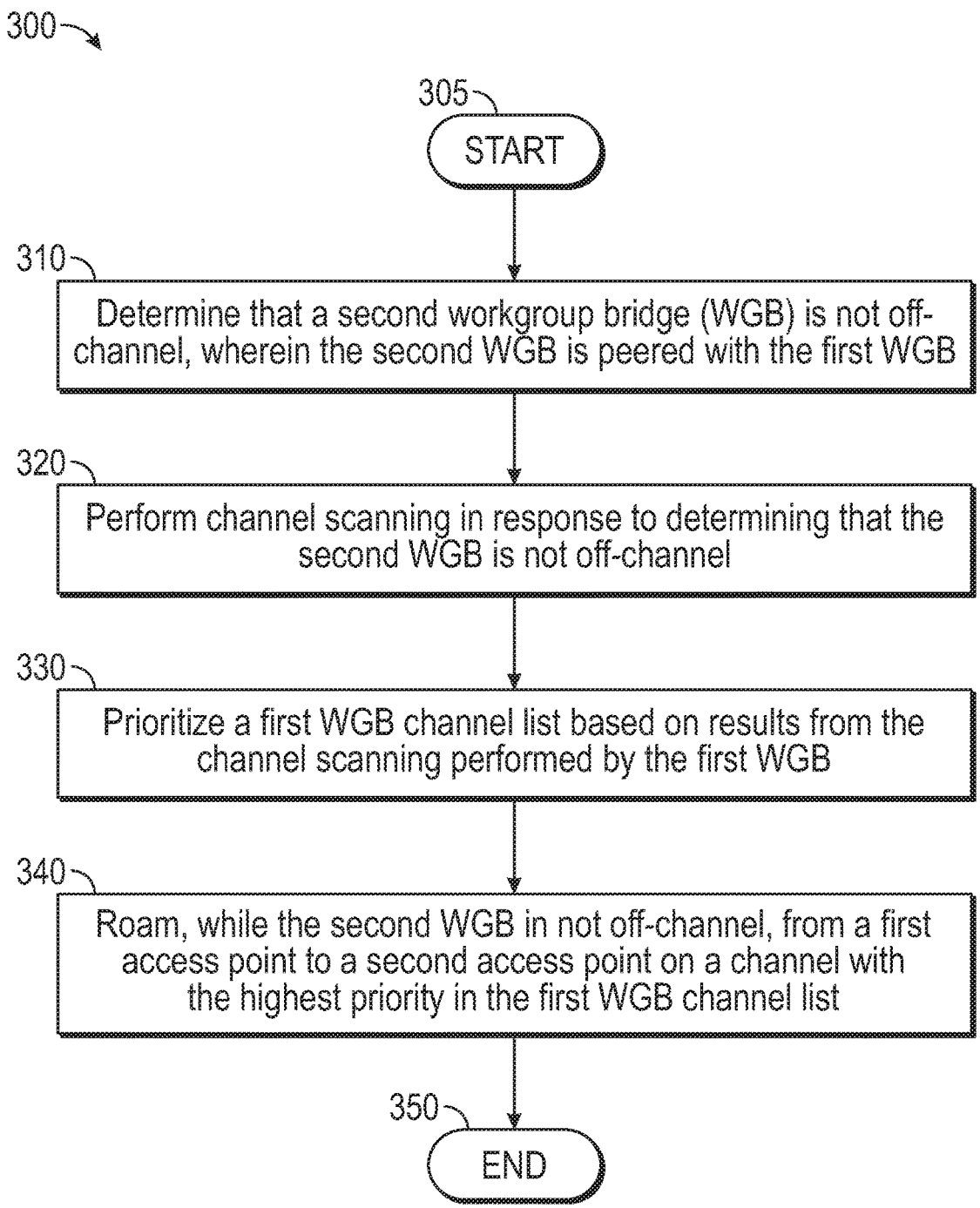
FIG. 3 is a flow chart of a method for providing off channel scanning on workgroup bridge (WGB) devices for fast roaming.

FIG. 3 is a flow chart setting forth the general stages involved in a method 300 consistent with an embodiment of the disclosure for providing off channel scanning on WGB devices for fast roaming. Method 300 may be implemented using first WGB 108 as described in more detail above with respect to FIG. 1 and FIG. 2. Ways to implement the stages of method 300 will be described in greater detail below.

Method 300 may begin at starting block 305 and proceed to stage 310 where first WGB 108 may determine that second WGB 110 may not be off-channel. Second WGB 110 may be peered with first WGB 108. Second WGB 110 may be peered with first WGB 108 by a wired connection and they may be kept alive with each other by a heartbeat message. Through this peering, first WGB 108 and second WGB 110 may communicate to one another their status of being on-channel, off-channel, or roaming for example. For example, as shown in FIG. 2 at position "A", first WGB 108 and second WGB 110 in WGB pair 102 may be wirelessly attached to first AP 210. First WGB 108 and second WGB 110 may each periodically scan a plurality of channel frequencies (e.g., first channel, second channel, and third channel) to determine if there is a better AP to be attached to while WGB pair 102 moves to various locations (e.g., positions "A", "B", "C", "D", "E", or "F").

As a result of each scan, first WGB 108 and second WGB 110 may each rank the plurality of channel frequencies in a list based on strength of signal received on a corresponding channel frequency. First WGB 108 and second WGB 110 may rank the plurality of channel frequencies in the same order or in different orders. Each WGB in WGB pair 102 may be provided with the channel frequencies to scan in a static configuration or the channel frequencies to scan may be dynamical received via messages.

First WGB 108 and second WGB 110 may communicate data packets between client 106 and network 206. Because first WGB 108 or second WGB 110 may go off-channel to perform the aforementioned scanning of the plurality of channel frequencies, first WGB 108 or second WGB 110 may potentially lose packets due to being off-channel. To address this potential packet loss due to being off-channel, consistent with embodiments of the disclosure, first WGB 108 and second WGB 110 may coordinate their off-channel scanning (e.g., and off-channel roaming) in such a way that neither is off-channel (e.g., scanning or roaming) at the same time. By coordinating being off-channel between first WGB 108 and second WGB 110 in WGB pair 102 of client environment 100, packet loss during off-channel scanning and roaming may be mitigated. In other words, when first WGB 108 is off-channel, second WGB 110 may communicate data packets between client 106 and network 206. And, when second WGB 110 is off-channel, first WGB 108 may communicate data packets between client 106 and network 206. By making sure at least one of first WGB 108 and second WGB 110 is not off-channel, packet loss may be mitigated.

From stage 310, where first WGB 108 determines that second WGB 110 may not be off-channel, method 300 may advance to stage 320 where first WGB 108 may perform channel scanning in response to determining that second WGB 110 is not off-channel. For example, each WGB in WGB pair 102 may notify its peer WGB before it starts channel scanning to check whether the peer WGB also wants to channel scan. For example, if there is no scheduled scan on second WGB 110, first WGB 108 may start its channel scanning. Once its scanning is finished, first WGB 108 may notify second WGB 110 that it is not in a scanning state. If there is scheduled scanning on second WGB 110, first WGB 108 may delay its scanning and start a timer to latter check whether second WGB 110 is finished scanning. Once second WGB 110 is finished scanning, second WGB 110 may notify its scanning result to first WGB 108.

Once first WGB 108 performs channel scanning in response to determining that second WGB 110 is not off-channel in stage 320, method 300 may continue to stage 330 where first WGB 108 may prioritize a first WGB channel list based on results from the channel scanning performed by first WGB 108. For example, at position "A" first WGB 108 and second WGB 110 may have both determined, by channel scanning, that the first channel is best, the second channel is second best, and the third channel is third best. However, as WGB pair 102 moves from position "A" to position "B", first WGB 108 may determine, based upon further channel scanning, that the second channel is best, the first channel is second best, and the third channel is third best. As a result, first WGB 108 may prioritize the first WGB channel list as the second channel having the highest priority, the first channel having second priority, and the third channel having third priority. Furthermore, while at position "B", second WGB 110 may still determine that the first channel is best, the second channel is second best, and the third channel is third best.

After first WGB 108 prioritizes the first WGB channel list based on results from the channel scanning performed by first WGB 108 in stage 330, method 300 may proceed to stage 340 where first WGB 108 may roam, while second WGB 110 in not off-channel, from first access point 210 to second access point 212 on a channel with the highest priority in the first WGB channel list. For example, because first WGB 108 may have prioritized the second channel as having the highest priority in the first WGB channel list, while at position "B", first WGB 108 may roam to second access point 212 on the second channel from first access point 210 on the first channel.

Moreover, first WGB 108 and second WGB 110 in WGB pair 102 may coordinate not being off-channel at the same time for any reason including scanning or roaming because, for example, if second WGB 110 is roaming and first WGB 108 starts scanning, packets may be dropped due to both first WGB 108 and second WGB 110 being off-channel. Once first WGB 108 roams, while second WGB 110 in not off-channel, from first access point 210 to second access point 212 on the channel with the highest priority in the first WGB channel list in stage 340, method 300 may then end at stage 350.

Consistent with embodiments of the disclosure first WGB 108 and second WGB 110 may share their WGB channel lists with each other. Based on different applications for client device 106, first WGB 108 may utilize the updated channel list (e.g., the first WGB channel list) in different ways. For example, it may reduce the shared channel list to one channel that corresponds to the highest priority channel and share this with second WGB 110. In this way, second WGB 110 may pre-authorize with an AP with the highest priority channel in the shared channel list while paying a minimum in scanning cost. Furthermore, second WGB 110 may refine its scanning results based on the result from first WGB 108, for example, first WGB 108 may always choose a best signal AP, but second WGB 110 may choose another AP on a different channel.

As illustrated in FIGS. 4A and 4B, first WGB 108 may coordinate with second WGB 110 and go off-channel for 30 ms and scan the first channel (i.e., ch1), the second channel (i.e., ch2), and the third channel (i.e., ch3) while second WGB 110 is on-channel. At time 405, WGB 102 may be at position "B" as shown in FIG. 2 and first WGB 108 may perform the channel scanning coordinated with second WGB 110 as described above with respect to FIG. 3. As shown in FIG. 4A, first WGB 108 may determine, based upon the channel scanning started at time 405, that the second channel (i.e., ch2) is best, the first channel (i.e., ch1) is second best, and the third channel (i.e., ch3) is third best. As a result, first WGB 108 may prioritize the first WGB channel list as the second channel (i.e., ch2) having the highest priority, the first channel (i.e., ch1) as having second priority, and the third channel (i.e., ch3) as having third priority. First WGB 108 may share the first WGB channel list with second WGB 110 that may confirm the priorities by performing its own scan at time 410 when first WGB 108 is back on-channel.

As a result, first WGB 108 and second WGB 110 may roam to and wirelessly attached to second AP 212 on second channel as shown in FIG. 2 at position "C". Being off-channel (e.g., scanning or roaming) by one of the two WGBs in WGB pair 102 may be coordinated with and performed while the other of the two WGBs in WGB pair 102 is on-channel in order to mitigate packet loss of data between client device 106 and network 206 as described above.

Figure 5:
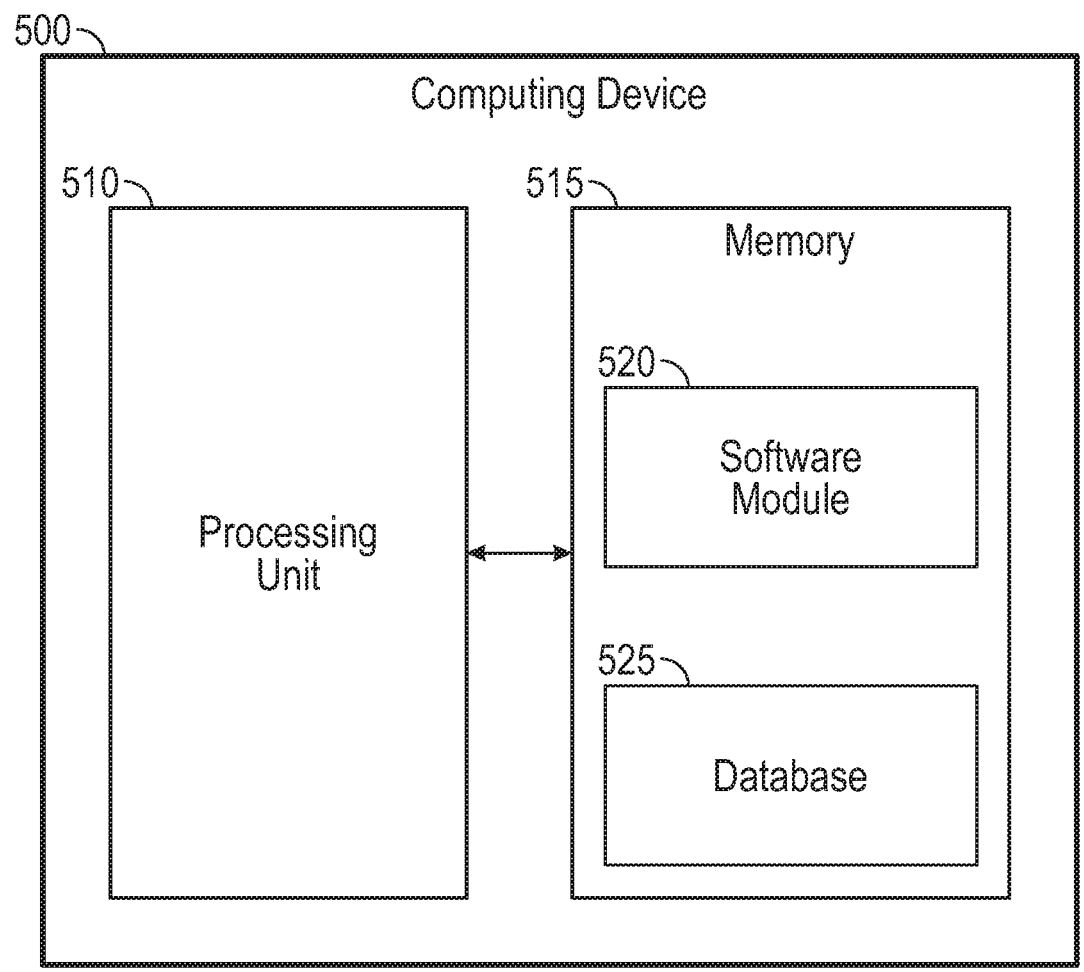
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing off channel scanning on WGB devices for fast roaming, including for example, any one or more of the stages from method 300 described above with respect to FIG. 3. Computing device 500, for example, may provide an operating environment for traffic distributor 104, client device 106, first WGB 108, second WGB 110, switch 208, first AP 210, second AP 212, and third AP 214. Traffic distributor 104, client device 106, first WGB 108, second WGB 110, switch 208, first AP 210, second AP 212, and third AP 214 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 and FIG. 2 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by a first workgroup bridge (WGB), that a second WGB is not off-channel, wherein the second WGB is peered with the first WGB;
   performing channel scanning, by the first WGB, in response to determining that the second WGB is not off-channel;
   prioritizing, by the first WGB, a first WGB channel list based on results from the channel scanning performed by the first WGB; and
   roaming, by the first WGB while the second WGB in not off-channel, from a first access point to a second access point on a channel with the highest priority in the first WGB channel list.

2. The method of claim 1, wherein determining, by the first WGB, that the second WGB is not off-channel comprises determining, by the first WGB, that the second WGB is not performing channel scanning.

3. The method of claim 1, wherein determining that the second WGB is not off-channel wherein the second WGB is peered with the first WGB comprise determining that the second WGB is not off-channel wherein the second WGB is peered with the first WGB by a wired connection and are kept alive with each other by a heartbeat message.

4. The method of claim 1, wherein roaming by the first WGB from the first access point to the second access point comprises, prior to roaming by the first WGB from the first access point to the second access point, the second WGB is also connected to the first access point.

5. The method of claim 1, further comprising providing, by the first WGB, the first WGB channel list to the second WGB.

6. The method of claim 1, further comprising:
   receiving, by the second WGB, the first WGB channel list from the first WGB;
   determining, by a second WGB, that a first WGB is not off-channel;
   performing channel scanning, by the second WGB, in response to determining that the first WGB is not off channel;
   prioritizing, by the second WGB, the first WGB channel list based on results from the channel scanning performed by the second WGB; and
   roaming, by the second WGB while the first WGB in not off-channel, from the first access point to the second access point on the channel with this highest priority in the first WGB channel list.

7. The method of claim 1, further comprising allowing a client devices to connect, through a traffic distributor, to both the first WGB and the second WGB.

8. A system comprising:
a memory storage; and
a processing unit coupled to the memory storage and disposed in a first workgroup bridge (WGB), wherein the processing unit is operative to:
determine that a second WGB is not off-channel, wherein the second WGB is peered with the first WGB;
perform channel scanning in response to determining that the second WGB is not off-channel;
prioritize a first WGB channel list based on results from the channel scanning performed; and
roam, while the second WGB in not off-channel, from a first access point to a second access point on a channel with the highest priority in the first WGB channel list.

9. The system of claim 8, wherein the processing unit being operative to determine that the second WGB is not off-channel comprises the processing unit being operative to determine that the second WGB is not performing channel scanning.

10. The system of claim 8, wherein the second WGB is peered with the first WGB by a wired connection and are kept alive with each other by a heartbeat message.

11. The system of claim 8, wherein the second WGB is also connected to the first access point.

12. The system of claim 8, wherein the processing unit is further operative to provide the first WGB channel list to the second WGB.

13. The system of claim 8, wherein a client devices is connected, through a traffic distributor, to both the first WGB and the second WGB.

14. A non-transitory computer-readable medium that stores a set of instructions which when executed perform a method comprising: determining, by a first workgroup bridge (WGB), that a second WGB is not off-channel, wherein the second WGB is peered with the first WGB; performing channel scanning, by the first WGB, in response to determining that the second WGB is not off-channel; prioritizing, by the first WGB, a first WGB channel list based on results from the channel scanning performed by the first WGB; and roaming, by the first WGB while the second WGB in not off-channel, from a first access point to a second access point on a channel with the highest priority in the first WGB channel list.

15. The non-transitory computer-readable medium of claim 14, wherein determining, by the first WGB, that the second WGB is not off-channel comprises determining, by the first WGB, that the second WGB is not performing channel scanning.

16. The non-transitory computer-readable medium of claim 14, wherein determining that the second WGB is not off-channel wherein the second WGB is peered with the first WGB comprise determining that the second WGB is not off-channel wherein the second WGB is peered with the first WGB by a wired connection and are kept alive with each other by a heartbeat message.

17. The non-transitory computer-readable medium of claim 14, wherein roaming by the first WGB from the first access point to the second access point comprises, prior to roaming by the first WGB from the first access point to the second access point, the second WGB is also connected to the first access point.

18. The non-transitory computer-readable medium of claim 14, further comprising providing, by the first WGB, the first WGB channel list to the second WGB.

19. The non-transitory computer-readable medium of claim 14, further comprising: receiving, by the second WGB, the first WGB channel list from the first WGB; determining, by a second WGB, that a first WGB is not off-channel; performing channel scanning, by the second WGB, in response to determining that the first WGB is not off channel; prioritizing, by the second WGB, the first WGB channel list based on results from the channel scanning performed by the second WGB; and roaming, by the second WGB while the first WGB in not off-channel, from the first access point to the second access point on the channel with this highest priority in the first WGB channel list.

20. The non-transitory computer-readable medium of claim 14, further comprising allowing a client devices to connect, through a traffic distributor, to both the first WGB and the second WGB.

* * * * *